Figure 12:
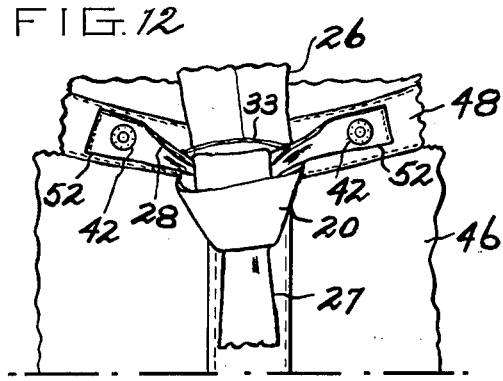

May 23, 1950 J. T. SCULLY 2,508,472
NECKTIE
Filed Jan. 21, 1946 5 Sheets-Sheet 1
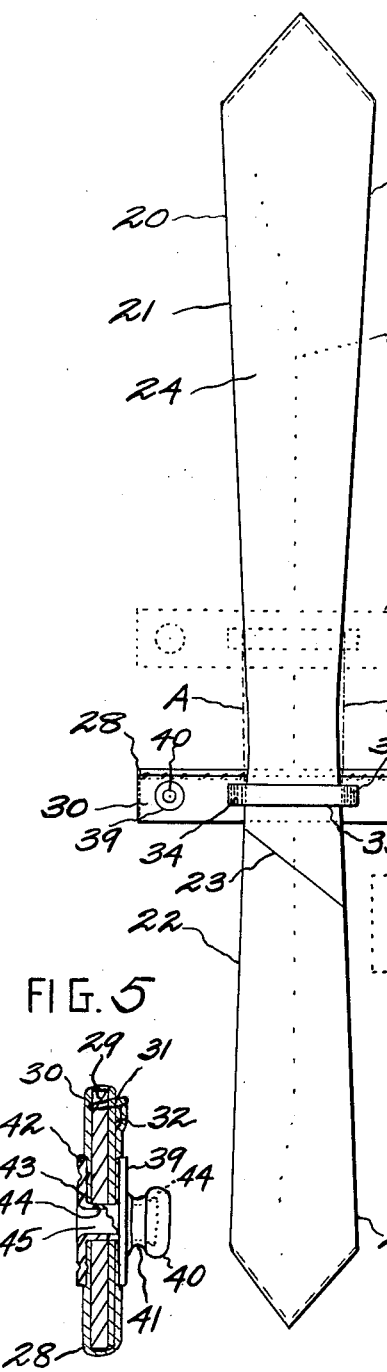
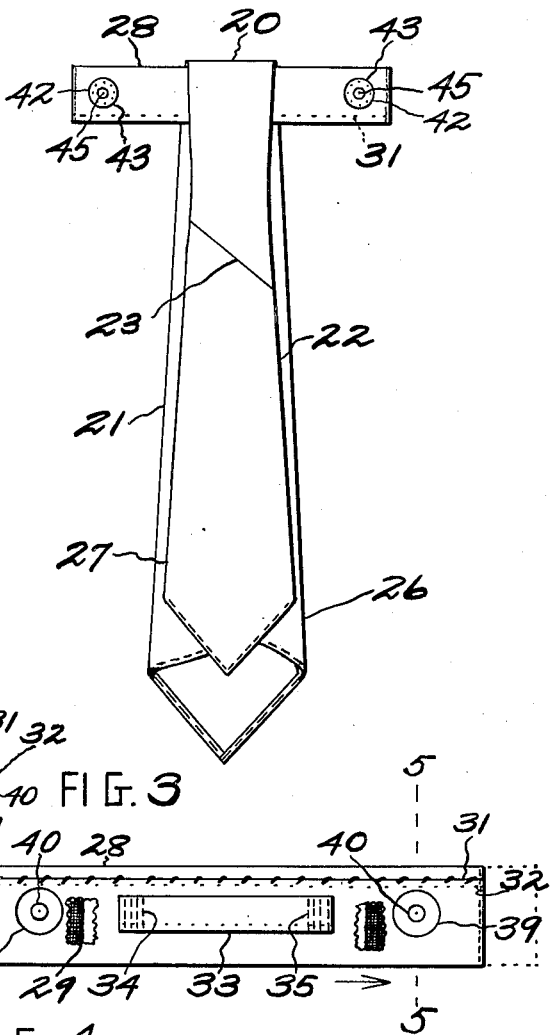
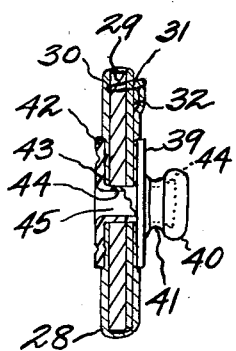
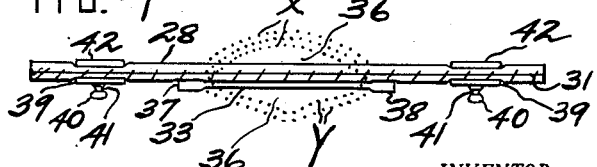
INVENTOR
John T. Scully May 23, 1950     J. T. SCULLY     2,508,472
NECKTIE
Filed Jan. 21, 1946     5 Sheets-Sheet 2
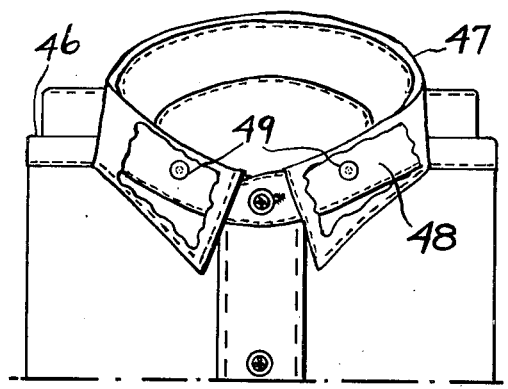
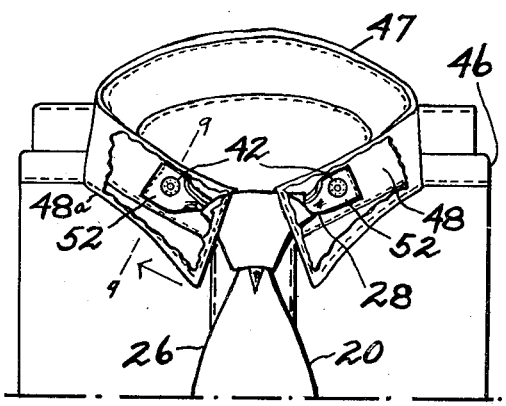
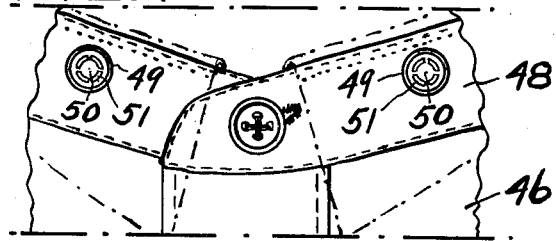
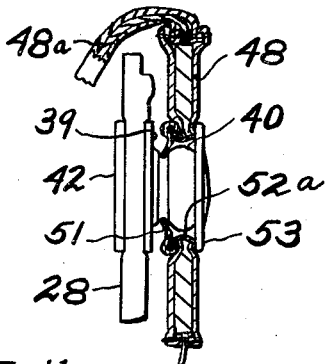
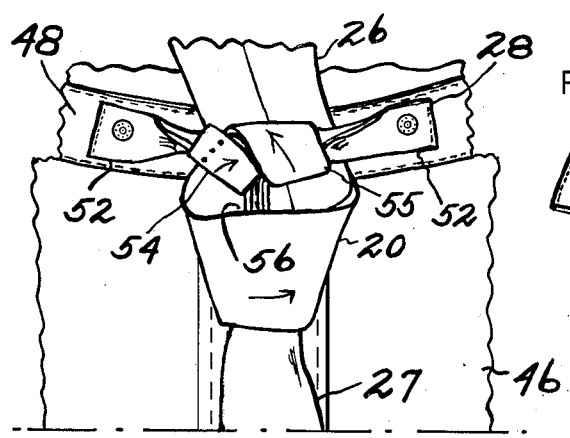
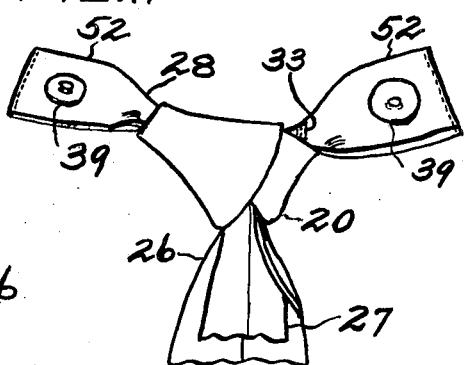
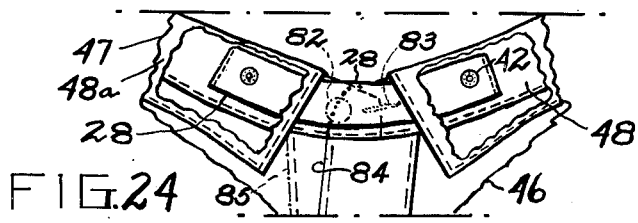
INVENTOR
John J. Scully John J. Scully
INVENTOR.

May 23, 1950     J. T. SCULLY     2,508,472
NECKTIE
Filed Jan. 21, 1946     5 Sheets-Sheet 4
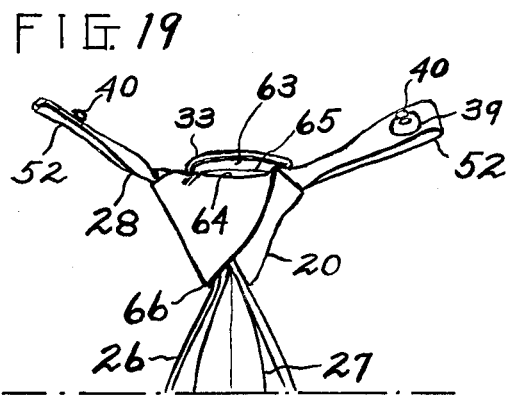
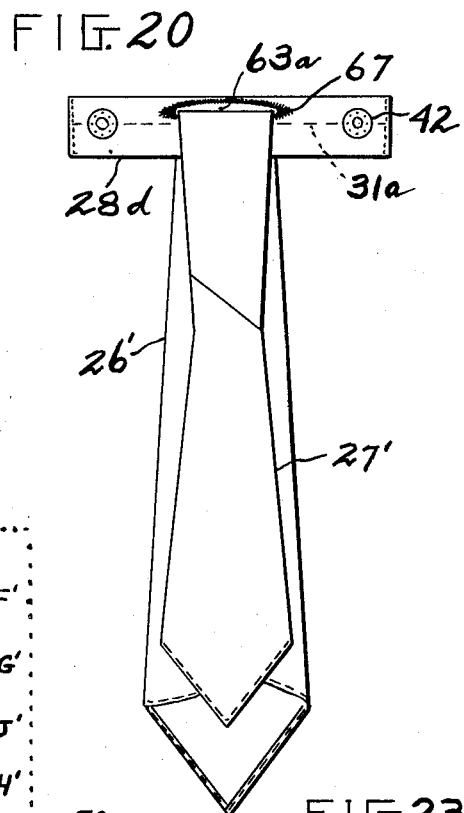
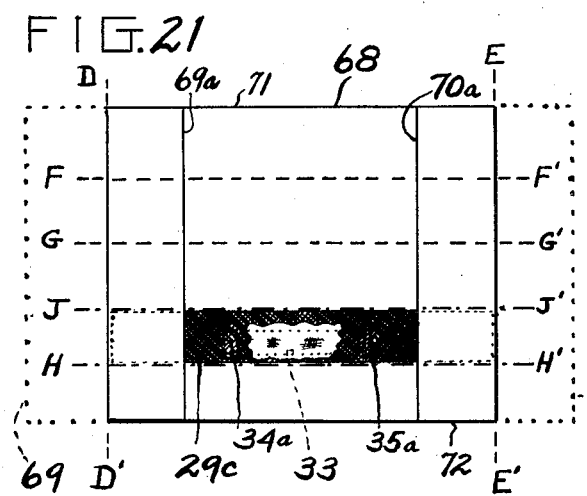
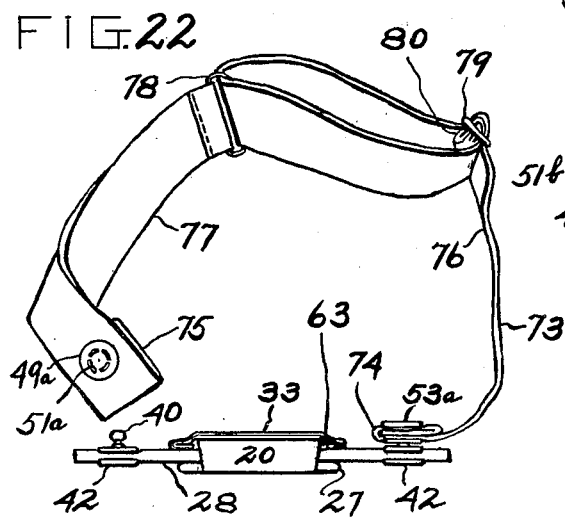
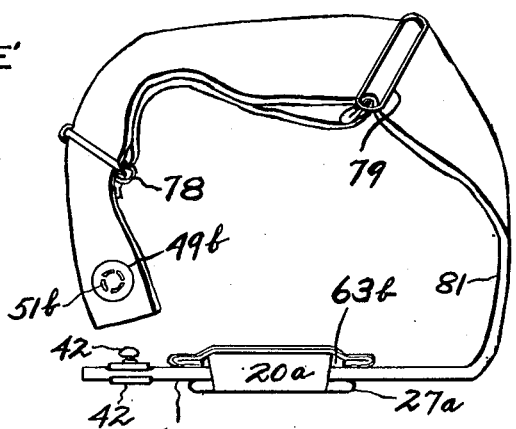

May 23, 1950 J. T. SCULLY 2,508,472
NECKTIE
Filed Jan. 21, 1946 5 Sheets-Sheet 5

INVENTOR,
John T. Scully

Patented May 23, 1950

2,508,472

UNITED STATES PATENT OFFICE 2,508,472

NECKTIE

John T. Scully, New York, N. Y.

Application January 21, 1946, Serial No. 642,513

6 Claims. (Cl. 2—145)

1

The present invention relates to wearing apparel generally, and more particularly to neckties.

A principal object of the invention is the provision of a necktie which presents a neat appearance and is comfortable to wear; further important objects are: the provision of an improved necktie which can be knotted or unknotted by the wearer or user, on or off a collar, and which can be removed from or fastened on the collar, while knotted or not knotted, quickly and conveniently; the provision of an improved necktie having a supporting member and a relatively movable supported or suspended member including depending or tieing portions which after unkotting of the necktie will remain together and not fall apart for hanging up the necktie or otherwise resting the fabric thereof; the provision of an improved necktie having a transverse supporting member supporting the depending or tieing portions of the necktie in such a manner as to control or substantially prevent lateral displacement of the depending portions relatively to the transverse supporting member; the provision in a necktie, having a plurality of members of improved means for simply, quickly and economically assembling the members in manufacture and for substantially retaining the members together during ordinary handling incident to manufacturer, seller or wearer; and the provision in a necktie having a plurality of members relatively movable to each other of simple and presentable means for substantially retaining the members together with the necktie in knotted or unknotted form. Further objects are to provide a necktie with an improved supporting member of the type equipped with side fasteners; to provide a necktie and collar combination cooperative to improve the drape and appearance of the necktie on the collar; and to provide a necktie and collar cooperative to properly locate and maintain the knot of the necktie relatively to the front opening of a soft turned down collar.

With these and other objects in view, the invention consists in the novel construction, arrangement, assembly, and cooperative action of the parts described and claimed in the specification, taken in connection with the accompanying drawings in which:

Fig. 1 is a plan view of the necktie showing the front face of one part and the rear face of another part. Fig. 2 is a front face view of the parts shown in Fig. 1 and with one part folded over the other. Fig. 3 is an enlarged rear face plan view with parts broken away, to show inner parts, of a part shown in Figs. 1 and 2. Fig. 4

Figure 13:
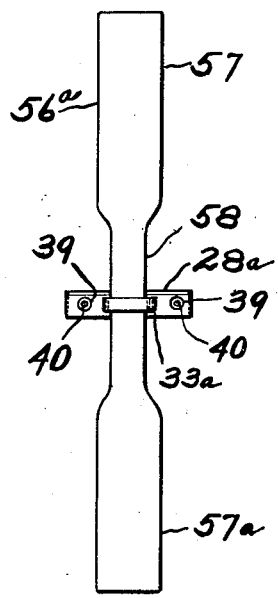
Figure 14:
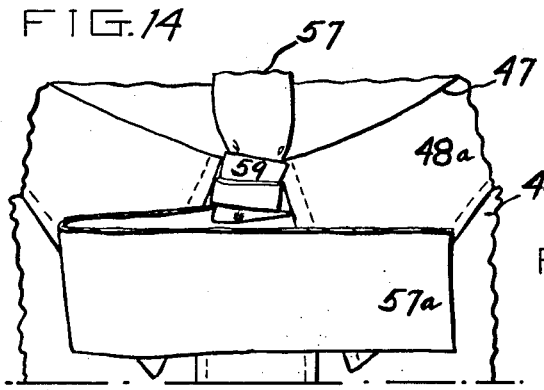
Figure 15:
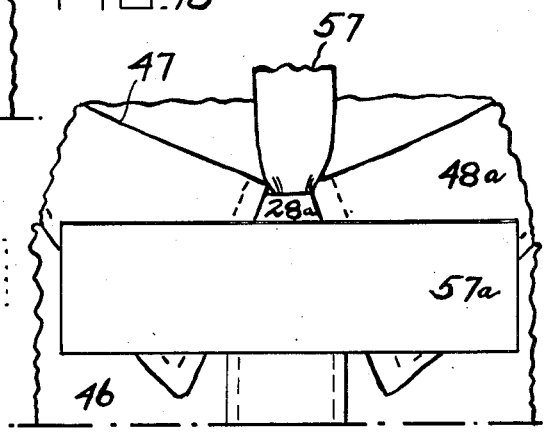
Figure 16:
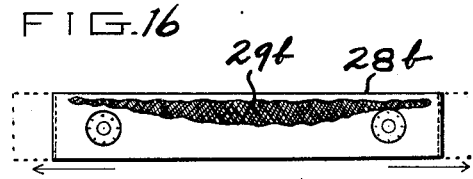
Figure 17:
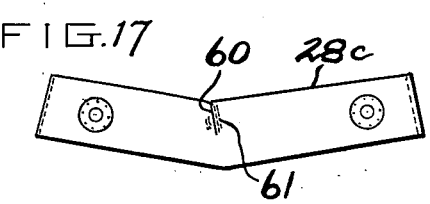
Figure 18:
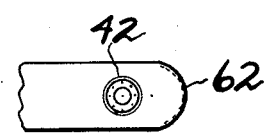
Figure 25:
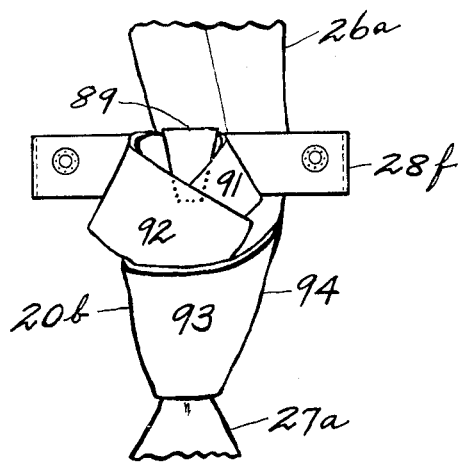
Figures 26, 26A:
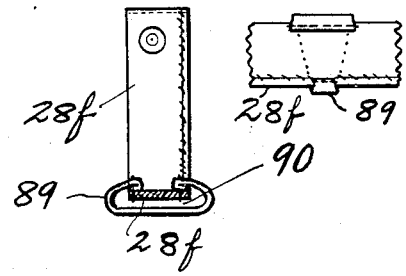
Figure 27:
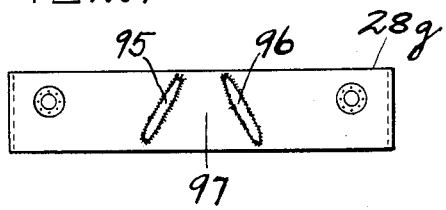
Figure 28:
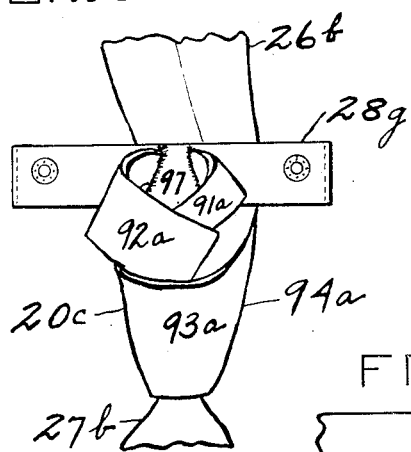
Figures 29, 30:
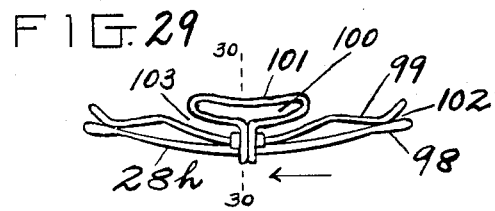
Figure 31:
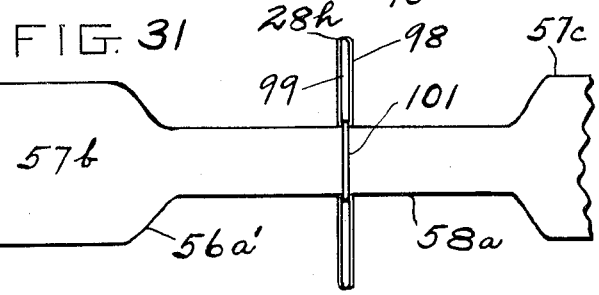
Figure 32:
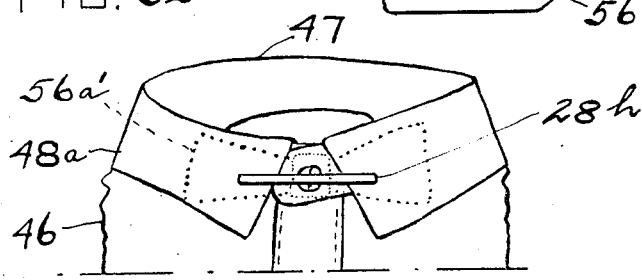

2 is a top plan view of the part shown in Fig. 3. Fig. 5 is a partly sectional and elevational view of a part, the section being taken on the line 5—5 of Fig. 3. Fig. 6 is a front elevation of a collar with parts broken away to show a kind of fastening means on a collar cooperative with fastening means on the necktie. Fig. 7 is a fragmentary and phantom view of the collar shown in Fig. 6. Fig. 8 is a front view, with parts broken away, of the collar shown in Fig. 6 and with the necktie fastened thereon. Fig. 9 is an enlarged sectional and elevational view of cooperative fastening parts, the section being taken on line 9—9 of Fig. 8. Fig. 10 is a fragmentary front elevation of collar and tie showing the necktie detachably fastened on the collar and in a stage of being knotted according to a manner of knotting. Fig. 11 is a rear view of the necktie completely knotted in the manner shown in Fig. 10 and detached from the collar. Fig. 12 is a fragmentary front elevation of the parts shown in Fig. 10 but with the tie being shown in a stage of being knotted in a different manner. Fig. 13 is an elevational view of a modification of necktie. Fig. 14 is a fragmentary front view of the necktie shown in Fig. 13 in a stage of being knotted or tied according to one manner. Fig. 15 shows in front elevation the necktie shown in Fig. 13 in a stage of being knotted or tied according to a different manner. Fig. 16 is a front face view, with a part broken away, of a modification of a part. Fig. 17 is a front face view of a further modification of a part. Fig. 18 is a fragmentary front face view showing a further modification of a part. Fig. 19 is a rear view of the necktie shown in Figs. 1 and 2 completely knotted in a different manner than shown in Figs. 8 and 11. Fig. 20 is a view similar to Fig. 2 but showing a modification of a part. Fig. 21 is a plan diagram showing one method of making a part. Fig. 22 is a perspective view of a modification in fastening means for fastening the necktie on the collar. Fig. 23 is a prespective view of a further modification of necktie fastenable on the collar. Fig. 24 is a fragmentary front view with parts of the collar broken away and illustrating a combined necktie supporting member and collar closure. Fig. 25 is a fragmentary front elevation of a further modification of necktie, shown partially knotted. Fig. 26 is a fragmentary rear face elevational and sectional view of a part shown in Fig. 25, and with the part folded upwardly to show another part in side view. Fig. 26a is a fragmentary rear view of parts shown in Figs. 25 and 26. Fig. 27 is a front face plan view of a part in a further modification of necktie. Fig. 28 is a view, somewhat similar to Fig. 25, of the modification of necktie of which Fig. 27 shows a part. Fig. 29 is a top plan view of a part in a further modification of necktie. Fig. 30 is a partly side elevation and partly sectional view on line 30—30 of Fig. 29. Fig. 31 is a fragmentary rear face elevation of the modification of necktie of which the part shown in Figs. 29 and 30 is a part. Fig. 32 is a front view of a collar showing the manner of fastening, detachably, the necktie shown in Fig. 31 thereon, the necktie being shown in knotted form in dotted outline.

Referring more particularly and in detail to the drawing:

In Fig. 1, the four-in-hand necktie, generally designated by 20, is comprised of the familiar large and small end portions 21 and 22, respectively, which are stitched together, end to end, along seam 23 to provide the usual relatively long fabric streamer which is folded on the bias over a bias lining to provide the front face 24 and the slipstitched seam 25 on the rear face slipstitched to the resilient lining, all according to the best practice in the art of making the customary four-in-hand necktie, although, in the present case, the streamer portion is devoid of the extra length required for the neckband portion of the ordinary necktie. This part of necktie is the tying member of the necktie and 20 is the supported or suspended portion or member thereof and is tapered as to width so as to widen, from an intermediate portion thereof, in opposite directions longitudinally towards the outer or free ends thereof, substantially as shown, and as indicated by relatively wide marginal ends 26 and 27, respectively. The tying and suspended member of necktie 20 is carried by the supporting member 28 which is comprised of a transversely extending, longitudinally resilient, substantially rectangular strip or band 30 of fabric of the same color or colors and of similar material as the streamer portion, and made by having its longitudinal ends folded towards each other over spaced pieces of lining 29 (see Fig. 3) and then having its longitudinal side edges folded towards each other on the bias of the strip to provide thereon the rear face having the longitudinal seam 31 stitched as shown to close it, or stitched in any other suitable manner to close it; the inturned opposite longitudinal ends indicated at 32 are preferably stitched in a suitable manner for both closing and reinforcing the ends. Centrally disposed longitudinally and on the rear face of the supporting member, a relatively short, narrow tie retainer portion 33 is provided and which is made from a piece of similar fabric and in the same general manner, but preferably devoid of the pieces of lining, and opposite ends of which are stitched by the longitudinally spaced series of stitches 34 and 35 to the rear layers or adjacent layers of the rectangular strip with the seam face of 33 facing the seam face of 30. There is thus formed in supporting member 28 a slot receiving the supported or suspended member, and this slot has a length between the innermost rows of the stitching 34 and 35 which is preferably relatively longer than the width of the suspended member in the intermediate portion of the latter and which is relatively shorter than the width of either marginal end 26 or 27 thereof; consequently, there is, normally, limited relative movement between the supported or suspended member and the supporting member, the length of the slot being represented by the distance between the dot and dash lines A and B, which distance is greater than the width of the intermediate portion of the supported or suspended member, as is clearly shown, and whereby the relative longitudinal movement between the members is indicated by the dotted rectangular outline C. Referring to Figs. 1, 2, 3 and 4, it will be observed that prior to knotting the necktie, according to a well known manner of tieing a tie, the supported or suspended member is folded intermediate its ends over a longitudinal side edge of the supporting member (see Fig. 2) with the smaller end 22 disposed on or adjacent the front face of member 28 and the larger end 21 on or adjacent the rear face of 28, the rear or seam faces of the end portions facing each other and the relative lengths of the draping larger and smaller ends to the supporting member being adjustable; it will be further observed (see Fig. 4) that member 28 is pliable so that the slot 36 receiving the suspended member between inturned stitched ends 37 and 38 of retainer portion 33 is, of course, variable as to shape and may be manually deformed, as by widening, as indicated by dotted lines X and Y. Since member 28 is normally longitudinally resilient as a whole throughout its intermediate portion longitudinally between the spaced pieces of lining 29 (substantially as indicated by the dotted outline at its opposite longitudinal ends in Fig. 3) the slot is capable of being lengthened by stretching member 28, and in this event retainer portion 33 is similarly stretched whereby the suspended member is substantially squeezed in the slot and more firmly held therein. Still referring to Figs. 1, 2, 3 and 4, supporting member 28 is provided with suitable fastening elements 39, 39, which are longitudinally spaced thereon on opposite sides of ends 37 and 38 of retainer 33, and, as shown, the fastening elements are preferably in the form of well known snap fastener studs 40, 40, adapted to cooperate with snap fastener sockets on a collar. Studs 40, 40, are on the rear or seam face of member 28 and have an annular external groove 41 (see Fig. 5) behind the domelike head to be gripped by the resilient gripping fingers of the socket members on the collar, and are united with member 28 by means of the clamping members 42, 42, comprising base portions 43, 43, having thereon posts 44, which are tubular as indicated at 45, extending through strip 30 into the studs, which latter are thereby fixed as to position relatively to the localized areas of member 28 which are clamped between the respective bases of the studs and the stud clamping elements 42, 42; the pieces of lining 29 are rectangular and relatively larger than the bases of the studs and the stud clamping elements between which they are clamped primarily to reinforce the ends of member 28 and to provide suitable thickness of material in strip 30 for securing the snap fasteners. It will be clear, upon particular reference to Fig. 3, that the pieces of lining 29 are positioned in the marginal and fastening ends of tubular strip portion 30 of member 28 on the "straight" rather than the "bias" of the lining material relative to the direction of longitudinal resilience of the strip and, consequently, these pieces of lining are non-resilient, or substantially non-resilient, in the lengthwise direction of member 28; further, it will be clear, upon particular reference to Figs. 4 and 5 also, that these pieces of lining 29 are fixedly secured to and disposed between the oppositely disposed outer layers of the flat tubular strip portion 30 of member 28 by the clamping action of the snap fastening elements 40, 40 and the clamping members 42 and, consequently, that the marginal ends, forming the manually manipulable fastening and unfastening ends, of member 28 are non-resilient, or substantially so, in the lengthwise direction of member 28, and particularly those portions of the marginal ends which extend longitudinally beyond the fastening elements and which portions normally will be seized by the wearer's fingers in a fabric squeezing and pulling action to unfasten the necktie from the collar, or at least from one side of the collar, to remove the latter from his neck; such a squeezing and pulling action for unfastening can be carried out more quickly than would be the case were these lined marginal ends longitudinally resilient and capable of being stretched similarly to the intermediate portion of member 28, and such pulling action can be carried out with minimum risk of tearing the fabric against the clamping fastening members or enlarging the holes of the portions of the fabric pierced by the clamping members. Also, the pieces of lining 29 serve to reinforce or stiffen the marginal ends of member 28, relative to the intermediate portion of the member, whereby the intermediate portion is relatively more pliable for collapse of or for longitudinal folding or curling of its longitudinal edges towards each other than are the marginal end portions, with the results that the portion of member 28 involved in the knot, the intermediate portion, is sufficiently pliable to be edgewise collapsed or folded in the knot without detracting from the neat appearance of the knot and without unnecessarily tending to loosen up or spread the knot, and, at the same time, the longitudinal edges of the marginal end portions resist longitudinal folding or curling or collapse and, hence, tend to remain flat and to avoid bulging out the outer fold of the turn down collar, between which fold and the neckband of the collar they are positioned. The lining pieces and stitching 32 serve to strengthen the extreme end portions of the marginal end portions outwardly beyond the clamping and fastening members against accidental transverse folding or curling. Referring to Fig. 1 particularly, it will be observed that in instances where the narrowest width of the intermediate portion of the suspended member may be in the slot and opposite retainer 33 that there can be a slight, or very limited, relative lateral movement of the supporting and the suspended members; however, as will later be observed, the knotting of the tie will substantially prevent such limited lateral movement, and in some instances the suspended member may have an intermediate portion of uniform width, or substantially so, which is just narrow enough to be received in the slot.

In assembling the members, in manufacture, it will be apparent from Fig. 1 that the supported member may be placed on the supporting member and then the retainer 33 may be stitched in place to retain the members together; however, it has been found more convenient to make the members separately complete, then widen the slot as illustrated in Fig. 4, with the fingers, then, with smaller end 27 of the suspended member temporarily folded in a longitudinal fold for a suitable distance from its pointed end, to insert the pointed end in the slot and draw the suspended member into the desired position; it has been further found that necktie 20 will withstand a substantially reasonable amount and degree of deliberate shaking by holding either end 26 or 27 in the hand without causing the suspended and the supporting members of the necktie to fall apart and become separated.

In Figs. 6, 7 and 8, a shirt 46 is shown provided with turn down collar 47, preferably of the soft variety, and on the inner fold or neckband 48 of which and opposite outer fold 48a are spaced snap fastener members 49 which are cooperative with snap fastener elements 39 previously described and which are spaced apart, with the collar buttoned, a distance substantially equal to the distance between elements 39 on member 28. On the outer face of the inner fold or neckband of the collar elements 49 are provided with stud-receiving sockets 50, 50, and stud-gripping fingers 51, 51, whereby the necktie may be snap fastened on the collar, as shown in Fig. 8, or detached therefrom, it being observed that member 28 has its central portion involved in the tie knot resulting in the laterally projecting oppositely disposed tab or wing fastening ends 52, 52. Upon reference to Fig. 9 is will be clear that the socket members on the collar are clamped on the neckband or inner fold thereof by means of the fingers 52a extending through the multiple layers of neckband fabric into annular grooves in the rear faces of the socket members from ring shaped clamping bases 53 on the inner face of the neckband of the collar, and, as a result, elements 49 are thereby fixed as to position relatively to the localized areas of neckband 48 which areas are clamped between the respective inner faces of the socket members and socket member clamping ring bases 53, and whereby shrinkage of the collar, enlargement of the neck of the wearer, or both, (making difficult or uncomfortable buttoning of the collar, conditions which are undesirable) resulting in an increase in the distance between elements 49, will not cause irritation to the neck of the wearer or damage to the collar by the elements 49 by reason of any pull towards the central front of the collar which may be exerted on elements 49 by tie tabs 52, 52, when the supporting member 28 may be under longitudinal tension because of said increase of distance between elements 49, or because of the manner in which the necktie may be knotted or both.

Referring again to Figs. 6, 7 and 8, it will be observed that collar 47 is preferably inclined or sloped downwardly from rear to front relatively to the axis of the shirt body and that fastening elements 49, 49 on the collar are, accordingly, high enough relatively to the upper front ends, or upper corners, of the outer fold of the collar to fasten the necktie with the top of the knot thereof adjacent the upper ends of the outer fold of the collar, and that the snap fastener elements on necktie supporting member 28 are suitably spaced apart relatively to the spacing of fasteners 49, 49 so that the resulting tab ends 52, 52 (Fig. 8) are inclined to each other somewhat in the manner of a wide bottom V, thereby supporting the knot neatly conformed to the collar front and without causing the knot to lift up the outer fold of the collar.

In Fig. 10, one manner of tieing the necktie into a substantial and firm neat knot is illustrated, and, in which the suspended member is first folded over the supporting member, similarly as in Fig. 2, and the necktie detachably fastened on the collar; then the larger end depending portion of the suspended member is folded over the front of the smaller end depending portion thereof, 27, in a direction from reader's left to right and then up and over supporting member 28, resulting in fold 54 substantially in the direction of the arrow shown thereon; the larger end is then folded from behind member 28 to the reader's right and brought across and up as indicated by fold 55, and, in the direction of the arrow on fold 55, is passed behind member 28, and, from reader's left, is brought transversely across, in the direction to the right, the front of portion 27 thereby providing the band loop fold open as at 56; the larger end is then passed upwardly behind member 28 and then folded forwardly and downwardly for insertion of its pointed end in open end 56 of the transverse band loop through which it is drawn to knot the tie, resulting in a knot formation similar to that shown in Figs. 8 and 11; fold 54 is prevented from lateral shifting to reader's left by retainer 33 on supporting member 28.

In Fig. 12, a simpler manner of tieing the four-in-hand knot is illustrated and wherein the larger end 26 is folded from behind depending end 27 transversely across the front thereof from reader's left to right, and is then passed up between supporting member 28 and the neckband of the collar, then its pointed end is inserted in the upper open end of the transverse band loop so formed, drawn through, and the knot tightened in the usual manner; retainer 33 substantially prevents or limits the tendency of this knot to spread laterally at its top or rear.

In Fig. 13, a modification of a necktie is illustrated in the form of a bow necktie generally designated by 56a which includes a tying and suspended member having oppositely disposed wings 57 and 57a relatively wider than and spaced by an intermediate portion 58 of the suspended member and which portion 58 thereof is of substantially uniform width. Supporting member 28a, which carries the suspended member of necktie 56a and is in other respects similar to previously described member 28, has a shorter retainer portion 33a forming a shorter slot than in member 28 and wherein portion 58 of the suspended member is longitudinally movable relatively to the supporting member, the slot being, preferably, just long enough to accommodate the width of this portion for longitudinal movement and to substantially prevent relative lateral movement of the members, and, in any event, the slot is shorter by a sufficiently suitable margin than the normal widths of wings 57 and 57a so that the members will be retained together for knotting or ordinary handling. Bow necktie 56a may be knotted in the manner illustrated in Fig. 14, in which the supporting member is snap fastened on the collar, by transversely or cross folding as in knotting the intermediate portion and then passing wing end 57 up behind the supporting member 28a to provide knot fold 59, then folding end wing 57a transversely across the front as shown, then passing end 57 downwards over 57a and then into and through the loop so formed at the rear of 57a, and then adjusting the portions for tightness of knot and shape of bow in the usual adjusting manner. To provide a relatively longer bow, the tie 56a may be tied in the simple manner shown in Fig. 15, in which one end wing, e. g. 57a, is folded across the front of the collar and the opposite end wing, 57, is folded from behind member 28a downwardly over 57a and then passed through the resulting loop in the usual manner. Knotted as indicated in Fig. 15, the wings will lie closer to the collar and the knot will be less bulky than is the case in Fig. 14. The members are assembled by folding longitudinally a wing end of the suspended member and inserting the folded end into the slot in the supporting member and drawing it through to the desired position.

In Fig. 16, the supporting member 28b, in other respects similar to member 28, is shown modified to the extent that lining 29b is resilient longitudinally and extends continuously for substantially the full inside length of the previously described member.

In Fig. 17, the supporting member 28c, in other respects similar to previously described member 28, is shown in the form of a slight V, being darted as at 60 and held so by suitable stitching 61.

In Fig. 18, the supporting member is shown having convexly curved end edges 62.

The four-in-hand necktie 20 may be knotted according to the earlier steps shown in, and in the manner of, either Fig. 10 or Fig. 12, with, however, the modified step of passing the large end portion 26 through the slot in the supporting member and then through the transverse band loop fold, resulting in a knot substantially as shown in rear view in Fig. 19, and in which retainer 33 is shown bulged outwardly showing a slot 63 between the retainer and knot top rear 64 and knot top band loop upper edge 65. A knot formed in this manner substantially prevents any lateral spread at the top portions 64 and 65, and the bottom 66 of the knot remains small enough to hold the depending portions well squeezed in this region. It will be observed that, in this form of knot, retainer 33 provides a loop by which the tie may be hung in knotted form on a hook, or on a post of a necktie rack.

In Fig. 20, the modified supporting member 28d of the four-in-hand necktie is provided with a suspended member receiving slot 63a formed through the body of the material of the supporting member and surrounded by strong buttonhole stitching 67. Slot 63a extends in the longitudinal direction of member 28d, is substantially centrally disposed between the snap fastener elements thereon, and is disposed between one longitudinal side edge of the member and the longitudinal seam 31a on the rear face of the member. The size of the slot relatively to the widths of the larger end 26' and 27' of the suspended member is small enough so that the supporting and suspended members are retained together as has previously been shown and described. This four-in-hand necktie may be tied as previously shown and described, and fastened on the collar as previously shown and described; member 28d is also longitudinally resilient and in other respects similar to previously described member 28.

The supporting member may be made in any suitable manner and of any suitable number of folds, for example where in instances the cover fabric and the lining may be very thin, as in summer wear, the member may have any desirable number of folds or layers to provide strength and to add thickness or bulk and firmness to the knot. A manner of making such a supporting member is diagrammatically illustrated in Fig. 21, in which a rectangular longitudinally resilient fabric cover 68 has an initial length between longitudinal ends as indicated by the dotted lines 69 and 70, the marginal ends are then folded towards each other on lines D—D' and E—E' with the folded end edges positioned parallel as at 69a and 70a; resilient lining 29c is then positioned on inner face of cover with its longitudinal ends in the folds and adjacent edges D—D' and E—E'; retainer 33 is then placed opposite the lining and on outer face of 68 and stitched as at 34a and 35a to the cover and the lining; the longitudinal side defined by edge 71 is folded on line F—F' so that edge 71 will lie approximately along line G—G'; then is folded again on approximately line G—G' so that edge 71 will lie approximately along line J—J'; the opposite longitudinal side defined by 72 is folded on line H—H' to substantially cover the exposed part of the lining; and then the final fold and seam are made by again folding the first folded side approximately along the line J—J' over the folded end 72 covering the lining; the resulting seam is then stitched in any suitable manner which will permit stretching of the member.

The four-in-hand or bow neckties herein shown may if desired be provided with a detachable neck encircling band which, because of the resilient construction of the supporting member, need not necessarily be itself resilient. The purpose of the neck encircling band is, essentially, to provide fastening means for the necktie for use with a collar not equipped with necktie fastening members. In Fig. 22, fastening band 73 has opposite ends 74 and 75 turned in and clamped by snap fastener members cooperative with the snap fastener members on the supporting member 28; the socket members 49a with resilient gripping fingers 51a are on the outer face of the band, and the socket member clamping rings 53a are on the inner face of the band ends. The band 73 is adjustable as to length and comprises the two fabric portions 76 and 77 connected by the ring 78; band portion 76 extends through an adjusting ring 79 having slots spaced by a vertical central bar and is folded as shown with one of its ends inturned as at 80 and stitched to provide a thick end thereon as a stop at one of the ring slots. Since the band is detachable, the wearer may dispense with same when wearing collar 47 and snap fasten the necktie on collar 47.

In the modification of necktie shown in Fig. 23, features already pointed out in the invention are shown as applied to a necktie having a permanent neck encircling band: The necktie 20a, in other respects similar to previously described necktie 20, has a supporting member 28e in the form of a resilient longitudinally extending adjustable neck encircling band 81 having at one end thereof snap fastener studs and at the opposite end cooperating snap fastener member 49b provided with stud-gripping fingers 51b; parts 63b and 27a are similar to the corresponding parts 63 and 27 in necktie 20.

It has hereinbefore been suggested, in connection with the description of Figs. 6, 7, 8 and 9, that the material of the collar may be such, in some instances, as to result in shrinkage of collar size after laundering, or that the neck of the wearer may become relatively enlarged to the size of the collar during the life of the latter, or both conditions may appear concomitantly, and that, as a consequence, proper closing of the collar is rendered difficult and uncomfortable, and in some instances may become impossible. In Fig. 24, such a condition is illustrated and wherein supporting member 28, forcibly disassembled from the supported or suspended member, is shown serving as an effective collar front closure for collar 47, the usual locking tabs of which have the usual button 82 and buttonhole 83 which, because of described said condition, can not cooperate to fasten the collar and, therefore, have lost their functions; member 28 substantially covers and hides the button and buttonhole and, being stretched in this circumstance and, therefore, under some tension longitudinally of itself, provides reinforcement to the collar front and a secure closure therefor; the front of shirt 46 appears substantially as shown with outer box plait 84 only partially overlapping seamed inner front 85. It will be apparent that previously described necktie 20 may therefore serve also as a collar closure, and it will be further apparent that member 28, or the other fabric supporting members herein, may be detached from the suspended member and employed as the collar closure, and that an ordinary necktie having the customary neck encircling band portion may be tied in the usual manner on the collar and substantially cover member 28, or that the ordinary necktie having the customary neck encircling band portion may be tied in a manner to incorporate member 28 in the knot portion thereof by passing an end of the tie up between member 28 and the outer locking tab of the collar whereby member 28 will also serve as a knot filler and a knot support. It will be obvious that in a collar having cooperative snap fastener elements as collar locking means instead of the button 82 and the buttonhole 83 member 28 will serve just as effectively as a collar closure, knot filler and knot support.

In Fig. 25, a further modification of a four-in-hand necktie is illustrated in which the supporting member 28f, in other respects being similar to previously shown and previously described member 28, is provided with a vertical retainer 89 in the form of a relatively narrow, folded, somewhat triangular fabric strip extending transversely across the front face of the supporting member and forming together therewith the suspended member receiving slot 90 (see Fig. 26) on the front of the supporting member 28f for retaining the suspended member longitudinally movable therein. The suspended member is the tying member of this necktie and is carried by the supporting member 28f of this necktie and the suspended member has oppositely disposed depending end portions of tapered width, the larger tapered end being designated by 26a and the smaller tapered end by 27a, which tapered end portions are spaced longitudinally by a relatively narrower intermediate portion of the suspended member; the intermediate portion of the suspended member is received in and is longitudinally movable in slot 90 of the supporting member which slot between its closed ends is shorter, therefore smaller, than the width of either end portions 26a or 27a of the suspended member. As will be observed, the necktie may be knotted in a different manner than has been previously described and somewhat similarly to the general manner of tieing the ordinary four-in-hand tie; the depending portion having the smaller tapered end 27a as indicated by 91 is drawn from the side at the right in the direction of the reader's left, and the depending portion having the larger tapered end 26a is drawn from the left across and in front of 91 in the direction towards reader's right as indicated by 92 and is then folded around the rear of the smaller end to provide the transverse band loop 93 into the hollow of which the pointed end of end 26a is inserted after being passed between supporting member 28f and the neckband of the collar, and then drawn through and the knot adjusted as desired. The knot so formed appears much as the usual four-in-hand knot with one side, in this case the side indicated by 94, having the appearance of being longer than the opposite side of the knot, the knot appearing slightly less symmetrical, but neat, than the four-in-hand knots previously described. It will be observed, upon particular reference to Fig. 26a that the relatively wide end of retainer 89 is secured on member 28f by stitching at the rear of member 28f and as close to the top longitudinal edge thereof as is deemed practical and extends longitudinally on the member 28f for the full width of the wide end of retainer 89, and that the narrow end of retainer 89 is similarly stitched adjacent the bottom longitudinal edge of member 28f. Because of the shape of retainer 89 and the further fact, particularly at its wider and upper end, that the securing stitching aids in maintaining the wider end wider than the narrower end during the knotting operation, the inclined side edges of the retainer in the upper portions thereof serve, in the initial stage of knotting in the illustrated manner, to cause the top edges of folds 91 and 92 to form a V-shape formation closely approximating the formation of the corresponding edges of the corresponding folds of the ordinary four-in-hand necktie at the corresponding stage of knotting, and with the result that the final knot has substantially the same appearance as the knot of the ordinary tie. If desired, this necktie may be knotted into substantially the form of knot commonly and currently called the "Windsor" knot (similar in appearance to the knot shown in Figs. 8 and 11); for example: instead of first folding big end portion 26a over the small end portion, as 92 and 91, portion 26a is first folded over the upper edge of member 28f in a diagonal direction to reader's right and passed diagonally downward, towards the reader's right, at the rear of member 28f and then, on reader's right side of the smaller end of the depending portion, is folded over the bottom edge of member 28f and passed diagonally upwardly to reader's left in front of member 28f and over the front of the first made diagonal fold and over its top and then downwardly behind member 28f, and then passed under the bottom edge of member 28f on the reader's left side of the member, and then folded transversely across, from reader's left to right, the front face of the smaller depending portion and towards the rear to form the transverse band loop of the knot, and then the big end is folded up and over the top of member 28f, from rear to front, and then passed into and drawn down into the transverse band loop to form the finished knot.

In Figs. 27 and 28, a further modification of four-in-hand necktie is shown: Necktie 20c has a supporting member 28g, in other respects similar to previously described supporting member 28 but devoid of retainer strip 33, which is provided with suitably spaced slits 95 and 96, preferably, but not necessarily, relatively inclined to each other substantially as shown, formed through the body of the material of the supporting member and surrounded by suitably strong buttonhole stitching, and forming a slot as in Fig. 28 for receiving the suspended member longitudinally movable therein; the retainer portion of this supporting member being the central portion 97 of member 28g. Necktie 20c is shown in Fig. 28 in approximately the same stage of knot formation as necktie 20b, the parts 26b, 97, 91a, 92a, 93a, 94a and 27b corresponding respectively to parts 26a, 89, 91, 92, 93, 94 and 27a of necktie 20b shown in Fig. 25. Neckties 20b and 20c have suspended members provided with relatively narrow intermediate portions between the opposite relatively wider end portions which latter are relatively wider than the lengths of the slots in the supporting members, similarly as has been described in connection with necktie 20. It will be apparent that a bow necktie having a suspended member similar to the suspended member shown in Fig. 13 may be provided with a supporting member similar to 28f in Fig. 25, or to 28g in Figs. 27 and 28. It will be obvious that the necktie 20c may, if desired, be knotted into the form of the so called "Windsor" knot. It should be pointed out in this instance that in the case of a four-in-hand knot, of either type, the finished knot should desirably be amply large relative to the spacing of slits 95 and 96 to cover or hide the slits from view, particularly so in the case of a knot formed in the manner shown and wherein, in tightening the knot, folds 91a and 92a laterally squeeze portion 97 and thereby widen the slits. In a bow tie such slits are substantially hidden by the wings of the bow on the sides of the knot.

In the further modification of necktie and parts thereof shown in Figs. 29, 30, 31 and 32, the bow necktie 56a' has a supporting member 28h made of hard material, preferably metal as it is shown, and is presented in the form of a combined supporting member, for the suspended member, and a collar holder-necktie fastener having a relatively rigid arcuate outer bar 98 and an inner, or rear, spring bar 99 extending longitudinally therewith and clamped soldered or welded to the outer bar approximately centrally of the latter's length. Bar 98 and resilient bar 99 function in the well known manner of the common collar holder by gripping the opposite front ends of the outer fold of a turn down collar. At the rear of the resilient inner bar a slot 100, for receiving longitudinally movable therein the suspended member of the necktie, is formed by a relatively rigid, metallic, elongated retainer ring 101, of generally concavo-convex shape, fixed to bars 98 and 99 by a pair of forwardly projecting arms, integral with the ring, and which are parallel and bent around the bars and the bar clamp and preferably soldered or spot welded thereto to securely clamp the ring on the bars and in proper position thereon. In order that the gripping ends of spring bar 99 may be opened widely enough from the gripping face of bar 98, in the regions indicated at 102, to make easy and convenient affixation on the collar, ring 101 is spaced rearwardly from bar 99 a suitable distance as indicated at 103 to prevent interference by the ring with the manually caused rearward movements theretowards of the spring arms of bar 99. The suspended member of necktie 56a' comprises the fabric member having the oppositely disposed end wings 57b and 57c spaced by a relatively narrower intermediate portion; slot 100 is long enough relatively to the width of the intermediate portion to permit longitudinal movement of said portion therein, and is short enough to substantially prevent lateral movement of said portion relatively to the bars; wings 57b and 57c are relatively wider than the length of the slot 100, whereby the wings cooperate with the retainer ring to retain the members together in ordinary handling of the necktie. In instances where the material of the suspended member is thin, the parts are assembled by longitudinally folding a wing end of the suspended member and inserting the folded end in slot 100 and drawing it through; in instances where the material of the suspended member may be relatively bulky or thick, the arms of ring 101, before attachment of the ring to bars 98 and 99, will be left spread outwardly apart to provide a side entrance to slot 100 through which entrance the intermediate portion, or a wing, may be passed edgewise into slot 100, after which the arms are squeezed together and curved around the bars as a clamp. Necktie 56a' may be knotted into a bow tie shape in either of the manners shown in Figs. 14 or 15, and as described in connection therewith, or may be knotted by passing one wing end, the lower, upwards in front of bar 98 and rearwardly over ring 101 and downwardly between the ring and collar neckband tabs, and passing the upper wing end downwardly in front of bar 98 and rearwardly upwardly behind the ring; then, by folding the lower wing end transversely in front of the collar (as in Fig. 15) and folding the upper wing thereover (as described in connection with Fig. 15) the tie will be presentably knotted and the rear of ring 101 will be substantially covered and hidden, and, in addition, the metal will be cushioned so as not to cause discomfort to the wearer's neck in instances where the wearer's chin movements may tend to press the covered ring against the front of the neckband or inner fold of the collar. As will be observed in Fig. 32, the supporting member is clippable onto the collar on the ends of the outer fold thereof similarly as is the ordinary collar holder, the knotted suspended member being shown in the dotted outline.

It has been suggested in the prior art that neckties be made with the depending portion or member secured to a fastening and supporting member by knotting the depending portion over the supporting member or stitching the depending portion thereto. In the former case when the depending member of the necktie is unknotted for hanging up and resting the fabric thereof, or for changing the shape of the knot, or forming the knot in a new location in the depending member, the parts or members separate with the result that it is inconvenient to handle the members, or stow them in a drawer, closet, travelling bag or the like, without dropping and soiling and eventually misplacing one member or the other. In the latter case, the permanent uniting of the members, by stitching or other fixing means, makes it practically impossible to form the knot in a new location of the depending member and, or, cover the soiled portion of the old knot, and, further, to vary the size of the knot in the same manner of fold, or to vary in the same manner of fold the length of the depending portion. It has been attempted, also, commercially to provide a necktie having an adjustable supporting band to surround the collar neckband, opposite ends of the band having cooperative hook and eyelet fastening means for fastening the necktie on the collar, with the suspended member folded over and knotted on the band. In this latter case, in addition to the objection that band and suspended member are susceptible, normally, to lateral shifting as a whole on the collar, is the objection further that even if the wearer wears the band uncomfortably tight on his neck the knot of the necktie is susceptible to relative lateral shifting on the band and, while this susceptibility may vary according to the tightness of the knot, attempts to control it by more or less continuously tightening the knit, as it tends to loosen during the wearer's body movements, usually result in prematurely wrinkling or otherwise soiling the material of the tie; and, as has heretofore been referred to, when the tie is unknotted the members fall apart with the objections noted. It has also been suggested in the prior art that made-up bow neckties be made with a loop band forming, or rather simulating, the knot centrally between the wings and that the band be clamped to the supporting member, or that it be stitched thereto; the loop band binding, in a squeezing action, the wing member to the supporting and fastening member. In the one case, the loop band is renewable upon opening the clamp arms and, in which instance, the members fall apart; in the other case, the tie members appear to be fixed, for all practical purposes, in permanently knotted form and incapable of having a new knot formed therein; and other objections are apparent. The present invention provides an improvement in neckties, free of the aforesaid objections.

Having described the invention, I claim:

1. As an article of manufacture, a necktie in unknotted form and including a supporting member adapted for positioning transversely of the front of a collar, a pliable longitudinal suspended member in said necktie manipulable for forming a knot in the necktie and carried by said supporting member thereof and having relatively wide opposite end portions spaced by a relatively narrower intermediate portion of said suspended member, means in the supporting member defining a slot therein and containing said suspended member with said intermediate portion thereof engaging in said slot and slidable lengthwise therein and with said relatively wide opposite end portions of said suspended member disposed on opposite sides of said slot, said end portions of said suspended member being relatively of greater normal size than the normal size of said slot for cooperation with said means in the supporting member whereby to cause either of said opposite end portions of the suspended member to be less freely slidable through said slot than said intermediate portion of said suspended member, and fastening means in said supporting member cooperative with means in a collar for detachably affixing the necktie on the collar.

2. As an article of manufacture, a necktie, of the four-in-hand type, in unknotted form and including a supporting member adapted for positioning transversely of the front of a collar, a pliable longitudinal suspended member in said necktie manipulable for forming a knot in the necktie and carried by said supporting member thereof and having relatively wide opposite end portions spaced by a relatively narrower intermediate portion of said suspended member, means in the supporting member defining a slot therein and containing said suspended member with said intermediate portion thereof engaging in said slot and slidable lengthwise therein and with said relatively wide opposite end portions of said suspended member disposed on opposite sides of said slot, said end portions of said suspended member being relatively of greater normal size than the normal size of said slot for cooperation with said means in the supporting member whereby to cause either of said opposite end portions of the suspended member to be less freely slidable through said slot than said intermediate portion of said suspended member, and fastening means in said supporting member cooperative with means in a collar for detachably affixing the necktie on the collar.

3. As an article of manufacture, a necktie in unknotted form and including a relatively short supporting member adapted for positioning transversely of the front of a collar, a relatively longer pliable longitudinal suspended member in said necktie manipulable for forming a knot in the necktie and carried by said supporting member thereof and having relatively wide opposite end portions spaced by a relatively narrower intermediate portion of said suspended member, means in the supporting member defining a slot therein and containing said suspended member with said intermediate portion thereof engaging in said slot and slidable lengthwise therein and with said relatively wide opposite end portions of said suspended member disposed on opposite sides of said slot, said end portions of said suspended member being relatively of greater normal size than the normal size of said slot for cooperation with said means in the supporting member whereby to cause either of said opposite end portions of the suspended member to be less freely slidable through said slot than said intermediate portion of said suspended member, and spaced fastening means in said supporting member, on laterally opposite sides of said slot thereof, cooperative with means in a collar for detachably affixing the necktie on the collar.

4. A necktie including a relatively short, pliable, supporting member comprised of multiple layers of fabric and adapted for positioning transversely of the front of a collar and having oppositely disposed marginal end fastening portions substantially non-resilient longitudinally and spaced by a longitudinally resilient intermediate portion of said supporting member, said intermediate portion of the supporting member being more resilient longitudinally than said end fastening portions thereof, a pliable suspended member in said necktie carried by said supporting member on said intermediate portion thereof, which suspended member may be folded intermediate its ends over said resilient portion to form the knot of the necktie between the end fastening portions of the supporting member, and snap fastening means in said supporting member on said marginal end fastening portions thereof clamping together said layers of fabric thereof and cooperative with spaced snap fastening means carried by a collar for detachably affixing said necktie on said collar.

5. A necktie including a relatively short, pliable, strip-like supporting member comprised of multiple layers of fabric and adapted for positioning transversely of the front of a collar and having oppositely disposed marginal end fastening portions longitudinally spaced by a knot supporting intermediate portion of relatively greater edgewise pliability transversely of the longitudinal edges of said member than said marginal end fastening portions thereof, whereby said intermediate portion is more freely foldable or collapsible in the direction towards its side edges than are said end fastening portions in the same direction, a relatively longer pliable suspended member in said necktie carried by said supporting member on said knot supporting intermediate portion thereof, which suspended member may be folded intermediate its ends over said intermediate portion of said supporting member to form the knot of the necktie between the end fastening portions of the supporting member, and snap fastening means in said supporting member on said marginal end fastening portions thereof and clamping together said layers of fabric thereof and cooperative with spaced snap fastening means carried by a collar for detachably affixing said necktie on said collar.

6. A necktie including a relatively short, pliable strip-like supporting member comprised of multiple layers of fabric and adapted for positioning transversely of the front of a collar and having oppositely disposed marginal end fastening portions substantially non-resilient longitudinally and spaced by a longitudinally resilient knot supporting intermediate portion of said supporting member, said intermediate portion of the supporting member being more resilient longitudinally than said end fastening portions thereof, and said intermediate portion of said supporting member being of relatively greater edgewise pliability transversely of the longitudinal edges of said member than said marginal end fastening portions thereof, whereby said intermediate portion is more freely foldable or collapsible in the direction towards its side edges than are said end fastening portions in the same direction, a relatively longer, pliable suspended member in said necktie carried by said supporting member on said knot supporting intermediate portion thereof, which suspended member may be folded intermediate its ends over said intermediate portion of said supporting member to form the necktie knot between the end fastening portions of the supporting member, and snap fastening means in said supporting member on said marginal end fastening portions thereof clamping together said layers of fabric thereof and cooperative with spaced snap fastening means carried by a collar for detachably affixing said necktie on said collar.

JOHN T. SCULLY.

REFERENCES CITED

The following references are of record in the file of this patent:

UNITED STATES PATENTS

| Number | Name | Date |
|---|---|---|
| 852,824 | Davies | May 7, 1907 |
| 1,324,740 | Hendrix | Dec. 9, 1919 |
| 1,588,609 | Palmer | June 15, 1926 |

FOREIGN PATENTS

| Number | Country | Date |
|---|---|---|
| 25,076 | Great Britain | Dec. 30, 1893 |